(12) United States Patent
Zhao et al.

(10) Patent No.: US 10,311,757 B2
(45) Date of Patent: Jun. 4, 2019

(54) DATA HIDING METHOD AND DATA HIDING SYSTEM

(71) Applicant: SHENZHEN UNIVERSITY, Shenzhen, Guangdong (CN)

(72) Inventors: Dongning Zhao, Guangdong (CN); Yong Zhang, Guangdong (CN); Weixin Xie, Guangdong (CN); Yanshan Li, Guangdong (CN); Jianping Yu, Guangdong (CN); Jianyong Chen, Guangdong (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 266 days.

(21) Appl. No.: 15/444,308

(22) Filed: Feb. 27, 2017

(65) Prior Publication Data

US 2017/0169736 A1 Jun. 15, 2017

Related U.S. Application Data

(63) Continuation of application No. PCT/CN2016/081390, filed on May 9, 2016.

(30) Foreign Application Priority Data

Oct. 15, 2015 (CN) .......................... 2015 1 0671142

(51) Int. Cl.
  *H04L 29/06* (2006.01)
  *G09C 1/00* (2006.01)
  *G09C 5/00* (2006.01)

(52) U.S. Cl.
  CPC .................. *G09C 1/00* (2013.01); *G09C 5/00* (2013.01); *H04L 2209/16* (2013.01)

(58) Field of Classification Search
  CPC .......... G09C 1/00; G09C 5/00; H04L 2209/16
  See application file for complete search history.

(56) References Cited

U.S. PATENT DOCUMENTS 6,055,321 A * 4/2000 Numao ................. G06T 1/0021
  382/100
7,796,777 B2 * 9/2010 Hsieh ................. G06K 9/00577
  382/100

(Continued)

OTHER PUBLICATIONS

Jung et al., "Image Data Hiding Method Based on Multi-pixel Differencing and LSB Substitution Methods", International Conference on Convergence and Hybrid Information Technology (Year: 2008).*

*Primary Examiner* — Morshed Mehedi (57) ABSTRACT

The invention relates to the technical field of data hiding, in particular to a data hiding method and a data hiding system. An image is used as a data carrier; after secret data is converted into a bit sequence by a sending end, the values of each bit in the bit sequence are hidden in the image; the image hidden with the secret data is obtained and is sent to a receiving end; and the receiving end can extract the hidden secret data from the image according to a corresponding secret key. During data hiding, each square image block can hide two-bit data through inverse number odd-even properties of a pixel gray value sequence of two diagonal lines of each square image block, so that the volume of data hidden in the image is twice of the number of the image blocks split by the image.

9 Claims, 5 Drawing Sheets

(56) References Cited

U.S. PATENT DOCUMENTS

| | | | | |
|---|---|---|---|---|
| 2004/0103285 A1* | 5/2004 | Nishitani | ............. | G06T 1/0028 |
| | | | | 713/176 |
| 2004/0247154 A1* | 12/2004 | Bodo | ................... | G06T 1/0085 |
| | | | | 382/100 |
| 2005/0144456 A1* | 6/2005 | Acharya | ............... | G06T 1/0028 |
| | | | | 713/176 |
| 2006/0013481 A1* | 1/2006 | Park | ................... | G06K 9/00711 |
| | | | | 382/170 |
| 2008/0130883 A1* | 6/2008 | Agaian | ................ | G06T 1/0028 |
| | | | | 380/54 |
| 2015/0103917 A1* | 4/2015 | Wang | ................... | H04N 19/159 |
| | | | | 375/240.24 |

* cited by examiner

1st  2nd  3rd                                              M(th)
group group group         .........                        group

Fig. 2

| 1st square image block | 2nd square image block | 3rd square image block | ... ... | ... ... | ... ... | ... ... | 16th square image block |
|---|---|---|---|---|---|---|---|
| 17th square image block | ... ... | ... ... | ... ... | ... ... | ... ... | ... ... | ... ... |
| ... ... | ... ... | ... ... | ... ... | ... ... | ... ... | ... ... | ... ... |
| ... ... | ... ... | ... ... | ... ... | ... ... | ... ... | M(th) square image block | ... ... |
| ... ... | ... ... | ... ... | ... ... | ... ... | ... ... | ... ... | ... ... |
| ... ... | ... ... | ... ... | ... ... | ... ... | ... ... | ... ... | P(th) square image block |

DATA HIDING METHOD AND DATA HIDING SYSTEM

CROSS REFERENCE TO RELATED APPLICATIONS

The present application is a Continuation Application of PCT application No. PCT/CN2016/081390 filed on May 9, 2016, which claims the benefit of Chinese Patent Application No. 201510671142.5 filed on Oct. 15, 2015. All the above are hereby incorporated by reference.

TECHNICAL FIELD

The invention relates to the technical field of data hiding, in particular to a data hiding method and a data hiding system.

BACKGROUND

In recent years, with rapid development of mobile Internet, 4G, and other communication technologies, the information transmission has become more and more convenient, and meanwhile such problems as the data transmission confidentiality have occurred. Encrypted transmission is a conventional solution, but it has the disadvantages of complex secret key management, low system efficiency, easily catching interceptors' attention, etc. These problems can be well solved by the data hiding technology. The secret data to be transmitted is hidden in the common file carrier content, and these common file carriers hidden with secret data transmitted to receivers, who will obtain the secret data hidden in the common file carriers through corresponding data extraction methods. The data hiding transmission way can avoid catching interceptors' attention, and the data transmission confidentiality can be improved while the secret key management complexity can be reduced, without affecting the system efficiency.

With rapid development of multimedia processing technology, it is generally easier to edit and process the image, video, audio and other multimedia files as the carrier files for data hiding transmission. Particularly with general application of smart phones, IPAD, digital cameras, etc. it becomes easier and easier to acquire images, and it has become a most common data hiding transmission way to use an image as a data carrier for data hiding transmission. However, in the existing image-based data hiding transmission way, under the premise of ensuring the quality of the carrier image after data hiding, the volume of the data hidden in the image is not large enough, which affects the applicability of the data hiding transmission way based on the image to the data hiding transmission.

SUMMARY

A technical problem to be solved by the present invention is to provide a data hiding method and data hiding system, which improves the volume of the data hidden in the image by using the image as the data hiding carrier under the premise of ensuring the image quality. The present invention is achieved as follows:

A data hiding method comprises the following steps:

Step A: converting data into a bit sequence; when the number of bits in the bit sequence is odd, filling a bit at the end of the bit sequence, and assigning 0 or 1 to it;

Step B: extracting the values of two bits every time from the bit sequence according to the order of the bit sequence as a set, to obtain M bit value sets; setting the value of the previous bit in each bit value as a first bit value in the bit value set, and the value of the later bit as a second bit value in the bit value set;

Step C: dividing a rectangular image as a carrier of the data into P square image blocks with the same size, P≥M, and extracting the first M square image blocks therein; each square image block in the M square image blocks has a first diagonal line and a second diagonal line;

Step D: detecting the gray values of each pixel on the first diagonal line and the second diagonal line of each square image block in the M square image blocks, to obtain pixel gray value sequences of the first diagonal line and the second diagonal line of each square image block, and detecting the inverse number odd-even property of each pixel gray value sequence, to obtain the inverse number odd-even properties of the pixel gray value sequences of the first diagonal line and the second diagonal line of each square image block;

Step E: representing the value of a bit with the inverse number odd-even property of the pixel gray value sequence of each diagonal line, and according to the principles on the one-to-one correspondence between the M square image blocks and the M bit value sets and the correspondence between the inverse number odd-even properties of the pixel gray value sequences of the first diagonal line and the second diagonal line of each square image block and the first bit value and the second bit value in the bit value set corresponding to the square image block, detecting whether the values represented by the inverse number odd-even properties of the pixel gray value sequences of the first diagonal line and the second diagonal line of each square image block in the M square image blocks are respectively consistent with the first bit value and the second bit value in the bit value set corresponding to the square image block, if no, regulating the pixel position on the square image block, so that the values represented by the inverse number odd-even properties of the pixel gray value sequences of the first diagonal line and the second diagonal line of the square image block are respectively consistent with the first bit value and the second bit value in the bit value set corresponding to the square image block.

Furthermore, the M is not prime.

Furthermore, the method of pixel position regulation on each square image block comprises the following steps:

Step E1: when the value represented only by the inverse number odd-even property of the pixel gray value sequence of the first diagonal line in the square image block is inconsistent with the first bit value in the bit value set corresponding to the square image block, extracting two pixels with unequal gray values and the minimum difference from the first diagonal line, and exchange the two pixels, so as to change the inverse number odd-even property of the pixel gray value sequence of the first diagonal line;

Step E2: when the value represented only by the inverse number odd-even property of the pixel gray value sequence of the second diagonal line in the square image block is inconsistent with the second bit value in the bit value set corresponding to the square image block, extracting two pixels with unequal gray values and the minimum difference from the second diagonal line, and exchanging the two pixels, so as to change the inverse number odd-even property of the pixel gray value sequence of the second diagonal line;

Step E3: when the values represented by the inverse number odd-even properties of the pixel gray value sequences of the first diagonal line and the second diagonal line in the square image block are respectively inconsistent with the first bit value and the second bit value in the bit value set corresponding to the square image block, comprising the following steps:

Step E3-1: respectively extracting a pixel from the first diagonal line and the second diagonal line of the square image block, and exchanging the two pixels;

Step E3-2: after exchange, detecting whether the inverse number odd-even properties of the pixel gray value sequences of the first diagonal line and the second diagonal line of the square image block are changed, if no, giving up this exchange and returning to the step E3-1, until the inverse number odd-even properties of the pixel gray value sequences of the first diagonal line and the second diagonal line of the square image block are changed.

Furthermore, the principle of respectively extracting a pixel from the first diagonal line and the second diagonal line of the square image block comprises the following steps: first to extract two pixels with the minimum gray value difference from small to big according to the gray value differences between the two extracted pixels.

Furthermore, if the size of the square image block is W×W, W is an even number, and W≥4.

A data sending method based on a data carrier of an image comprises the steps contained by any of the aforesaid data hiding methods, and further comprises the following steps:

Step F: sending out the rectangular image as the carrier of the data and the secret key thereof; the secret key contains the size and the number of bits as defined in claim 1.

A method of extracting the data sent by the aforesaid data sending method comprises the following steps:

Step 1: reading the received rectangular image as the carrier of the data and the secret key thereof; the secret key contains the size and the number of bits as defined in claim 1, and the number of bits is set as N;

Step 2: dividing the rectangular image into P square image blocks with the size, and extracting the first M square image blocks therefrom; M is a value of rounding $$\frac{N+1}{2};$$

Step 3: detecting the gray values of each pixel on the first diagonal line and the second diagonal line of each square image block in the M square image blocks, to obtain pixel gray value sequences of the first diagonal line and the second diagonal line of each square image block, and detecting the inverse number odd-even property of each pixel gray value sequence, to obtain the inverse number odd-even properties of the pixel gray value sequences of the first diagonal line and the second diagonal line of each square image block;

Step 4: based on the principle of representing a value of a bit with the inverse number odd-even property of the pixel gray value sequence of each diagonal line, arranging the bit values represented by the inverse number odd-even properties of the pixel gray value sequences of the first diagonal line and the second diagonal line of each square image block in the M square image blocks according to the order of all square image blocks, to obtain a bit sequence; when the number of bits is odd, taking out the last bit of the obtained bit sequence;

Step 5: restoring the obtained bit sequence as data.

A data hiding system comprises:

a data conversion module, used for converting data into a bit sequence; when the number of bits in the bit sequence is odd, filling a bit at the end of the bit sequence, and assigning 0 or 1 to it;

a bit grouping module, used for extracting the values of two bits every time from the bit sequence according to the order of the bit sequence as a set, to obtain M bit value sets; setting the value of the previous bit in each bit value as a first bit value in the bit value set, and the value of the later bit as a second bit value in the bit value set;

an image division module, used for dividing a rectangular image as a carrier of the data into P square image blocks with the same size, P≥M, and extracting the first M square image blocks therein; each square image block in the M square image blocks has a first diagonal line and a second diagonal line;

an image block detection module, used for detecting the gray values of each pixel on the first diagonal line and the second diagonal line of each square image block in the M square image blocks, to obtain pixel gray value sequences of the first diagonal line and the second diagonal line of each square image block, and detecting the inverse number odd-even property of each pixel gray value sequence, to obtain the inverse number odd-even properties of the pixel gray value sequences of the first diagonal line and the second diagonal line of each square image block;

an image block regulation module, used for representing the value of a bit with the inverse number odd-even property of the pixel gray value sequence of each diagonal line, and according to the principles on the one-to-one correspondence between the M square image blocks and the M bit value sets and the correspondence between the inverse number odd-even properties of the pixel gray value sequences of the first diagonal line and the second diagonal line of each square image block and the first bit value and the second bit value in the bit value set corresponding to the square image block, detecting whether the values represented by the inverse number odd-even properties of the pixel gray value sequences of the first diagonal line and the second diagonal line of each square image block in the M square image blocks are respectively consistent with the first bit value and the second bit value in the bit value set corresponding to the square image block, if no, regulating the pixel position on the square image block, so that the values represented by the inverse number odd-even properties of the pixel gray value sequences of the first diagonal line and the second diagonal line of the square image block are respectively consistent with the first bit value and the second bit value in the bit value set corresponding to the square image block.

Furthermore, during pixel position regulation on each square image block by the image block regulation module:

When the value represented only by the inverse number odd-even property of the pixel gray value sequence of the first diagonal line in the square image block is inconsistent with the first bit value in the bit value set corresponding to the square image block, extract two pixels with unequal gray values and the minimum difference from the first diagonal line, and exchange the two pixels, so as to change the inverse number odd-even property of the pixel gray value sequence of the first diagonal line;

When the value represented only by the inverse number odd-even property of the pixel gray value sequence of the second diagonal line in the square image block is inconsistent with the second bit value in the bit value set corresponding to the square image block, extract two pixels with unequal gray values and the minimum difference from the second diagonal line, and exchange the two pixels, so as to change the inverse number odd-even property of the pixel gray value sequence of the second diagonal line;

When the values represented by the inverse number odd-even properties of the pixel gray value sequences of the first diagonal line and the second diagonal line in the square image block are respectively inconsistent with the first bit value and the second bit value in the bit value set corresponding to the square image block, pixel position regulation on each square image block by the image block regulation module comprises the following steps:

respectively extracting a pixel from the first diagonal line and the second diagonal line of the square image block, and exchanging the two pixels;

after exchange, detecting whether the inverse number odd-even properties of the pixel gray value sequences of the first diagonal line and the second diagonal line of the square image block are changed, if no, giving up this exchange and respectively extracting a pixel from the first diagonal line and the second diagonal line of the square image block again for exchange, until the inverse number odd-even properties of the pixel gray value sequences of the first diagonal line and the second diagonal line of the square image block are changed.

Furthermore, the principle of respectively extracting a pixel from the first diagonal line and the second diagonal line of the square image block by the image block regulation module comprises the following steps: first to extract two pixels with the minimum gray value difference from small to big according to the gray value differences between the two extracted pixels.

Compared with the prior art, by using the present invention, each square image block can hide two-bit data through the inverse number odd-even properties of the pixel gray value sequences of two diagonal lines of each square image block, so that the volume of data hidden in the image is twice of the number of the image blocks split by the image. Moreover, during pixel position regulation on each square image block, only the gray values of at most two pixels on the first diagonal line and the second diagonal line of the square image block need to be regulated, so that the influence on the image quality is little, and the image quality is ensured.

DETAILED DESCRIPTION

In order to make the purpose, technical solution and advantages of the present invention more clear, the present invention will be further described in detail in combination with accompanied drawings and embodiments.

To solve the problem that the existing image-based data hiding transmission way has small data hiding volume, the present invention provides a data hiding method, wherein an image is used as a data carrier, after secret data is converted into a bit sequence by a sending end, the values of each bit in the bit sequence are hidden in the image, the image hidden with the secret data is obtained and is sent to a receiving end, and the receiving end can extract the hidden secret data from the image according to a corresponding secret key.

Figure 1:
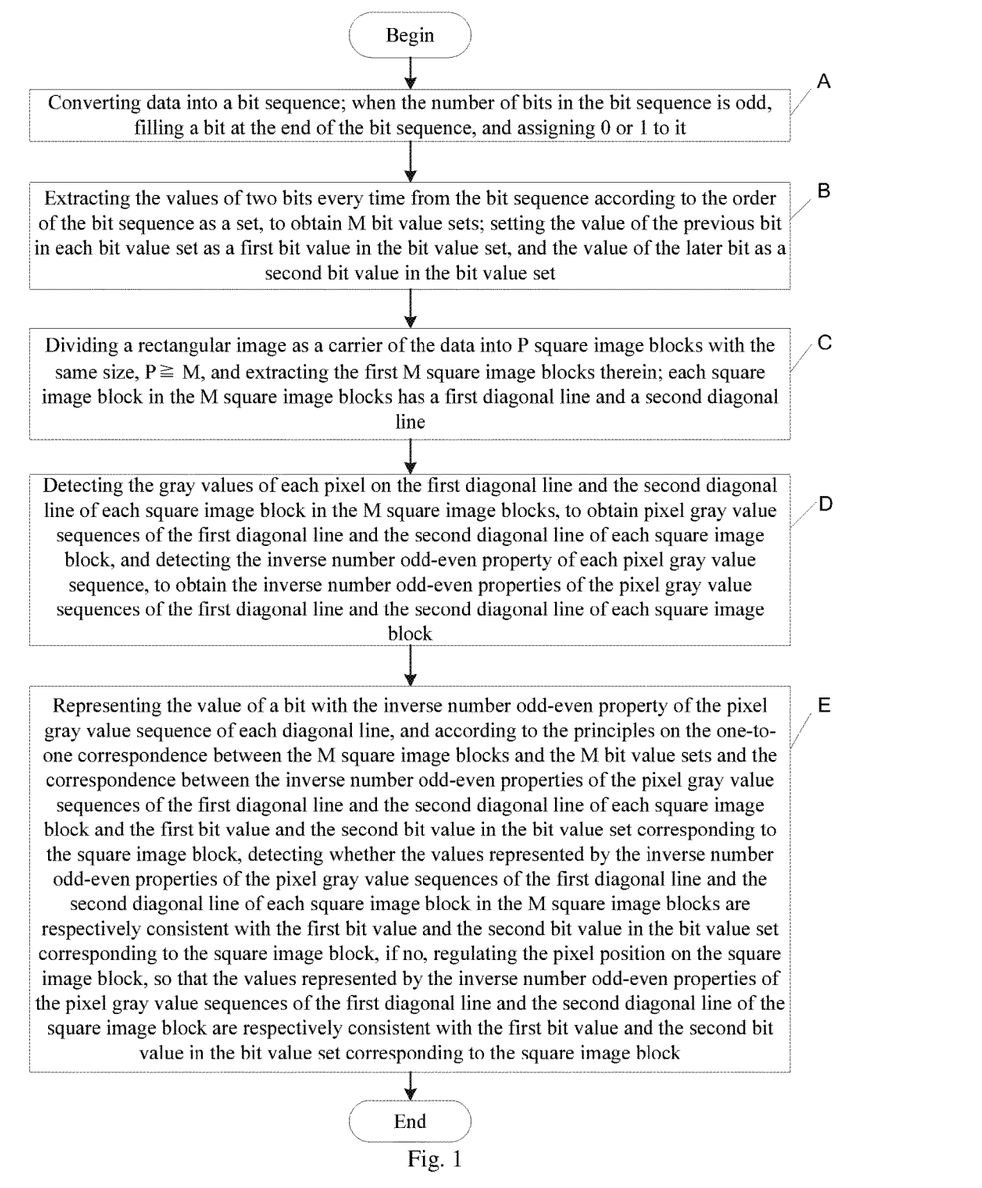
FIG. 1 is a flow diagram of the data hiding method provided by the present invention.

As shown in FIG. 1, the present invention provides a data hiding method, comprising the following steps:

Step A: converting data into a bit sequence; when the number of bits in the bit sequence is odd, filling a bit at the end of the bit sequence, and assigning 0 or 1 to it.

Step B: extracting the values of two bits every time from the bit sequence according to the order of the bit sequence as a set, to obtain M bit value sets; setting the value of the previous bit in each bit value as a first bit value in the bit value set, and the value of the later bit as a second bit value in the bit value set.

Figure 2:
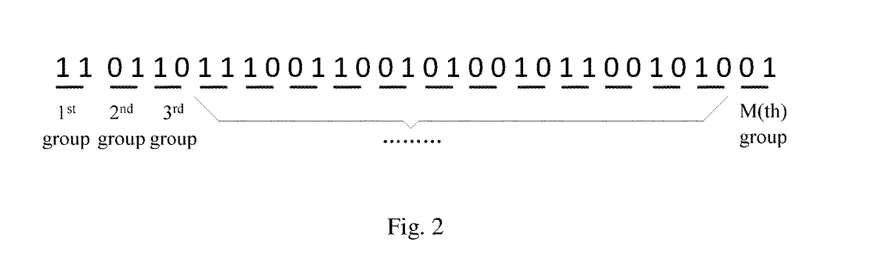
FIG. 2 is a schematic diagram of bit grouping in the data hiding method provided by the present invention.

The bit is the smallest storage unit in a computer, and the value of a bit is represented by 0 or 1; the data is represented by a bit sequence in the computer. It is proposed to divide the rectangular image into several square image blocks in the present invention, and each square image block is used for hiding data by the way of hiding two-bit data. Therefore, each bit in the bit sequence is grouped according to the above method, and each group contains the values of two bits. As shown in FIG. 2, the first bit value set contains the values of a first bit and a second bit, 1 and 1, wherein the value of the first bit is the first bit value of the first bit value set, and the value of the second bit value set is the second bit value of the first bit value set, the second bit value set contains the values of a third bit and a fourth bit, 0 and 1, wherein the value of the third bit is the first bit value of the second bit value set, and the value of the fourth bit is the second bit value of the second bit value set, and so on for the value of the later bits. When the number of bits is odd, the last group only contains the value of one bit, thus, in this case, for convenient calculation, a bit is filled at the end of the bit sequence, and the value of the filled bit is set as 1 or 0, so that the last bit value set contains two bit values, and it only needs to take out the value filled in the bit when extracting the hidden data from an image.

Figure 3:
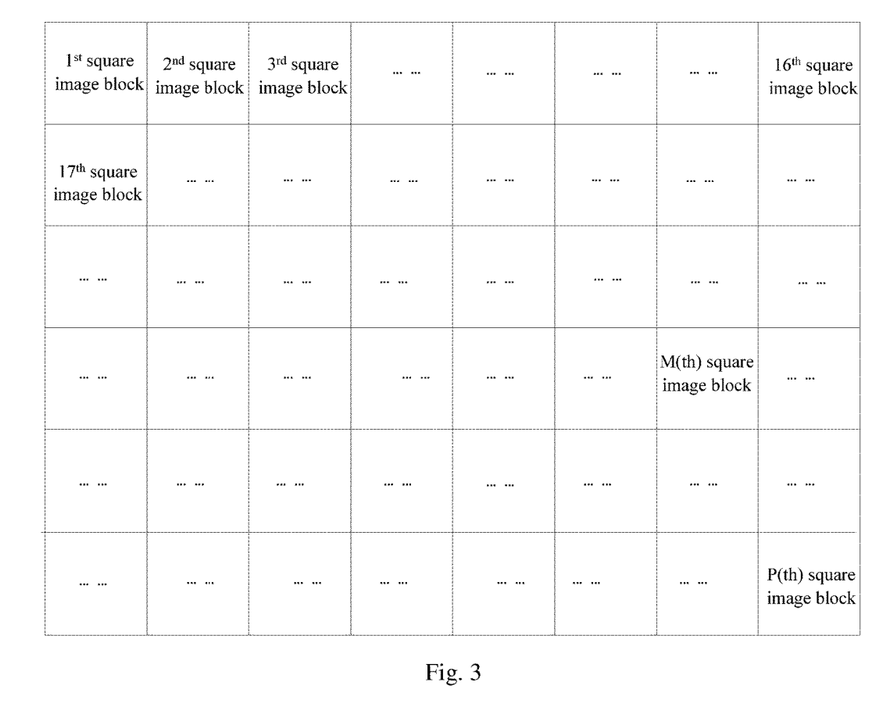
FIG. 3 is a schematic diagram of image division in the data hiding method provided by the present invention.

Step C: dividing a rectangular image as a carrier of the data into P square image blocks with the same size, P≥M, and extracting the first M square image blocks therein; each square image block in the M square image blocks has the first diagonal line and the second diagonal line. As shown in FIG. 3, the rectangular image is divided into P square image blocks, i.e. the P square image blocks form a complete rectangular image as mentioned above. As mentioned above, it is proposed to divide the rectangular image into several square image blocks in the present invention, i.e. each square image block hides the data of a bit value set, thus the quantity of the square image blocks divided shall be at least up to the quantity (i.e. P≥M) of the bit value sets divided in the step B. It only needs M square image blocks to hide the data of M bit value sets, so it only needs to extract the first M square image blocks. Generally, as shown in FIG. 3, the first M square image blocks can be extracted from the initial position (the upper right corner) of the rectangular image according to the order. FIG. 3 is a more ideal division result: both the length and width of the rectangular image are the integral multiples of the width of the square image block, and the rectangular image is just divided into P square image blocks. However, in many cases, after the size of the square image block is determined, if the length and/or width of the rectangular image is not the integral multiple of the width of the square image block, there will be an area left at the end in the length and/or width direction, not enough to form a square image with the size during division of the rectangular image, so it will not generate any substantial influence on data hiding and extraction.

Figure 4:
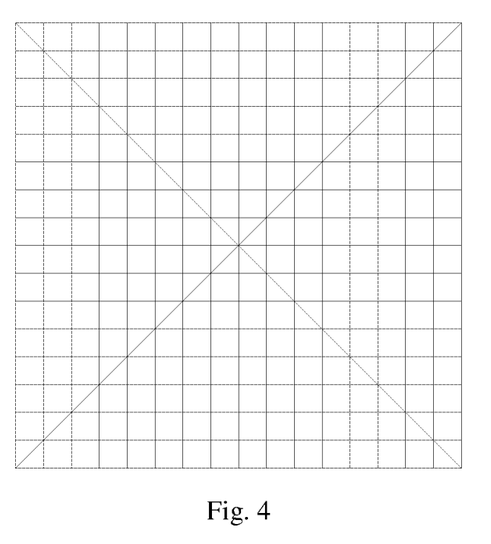
FIG. 4 is a schematic diagram of the square image block and diagonal lines thereof.

Step D: detecting the gray values of each pixel on the first diagonal line and the second diagonal line of each square image block in the M square image blocks, to obtain pixel gray value sequences of the first diagonal line and the second diagonal line of each square image block, and detecting the inverse number odd-even property of each pixel gray value sequence, to obtain the inverse number odd-even properties of the pixel gray value sequences of the first diagonal line and the second diagonal line of each square image block. FIG. 4 is a schematic diagram of a square image block. In the figure, the diagonal line from the upper left corner to the lower right corner is defined as a first diagonal line of the square image block, and the diagonal line from the upper right corner to the lower left corner is defined as a second diagonal line of the square image block. The pixel gray value sequences of the first diagonal line and the second diagonal line of the square image block are obtained through detecting the gray values of each pixel on the first diagonal line and the second diagonal line. The pixel gray value sequence of each diagonal line has its odd-even properties, and the value of the bit is either 1 or 0, while the inverse number odd-even properties of the sequence is either odd or even, thus the inverse number odd-even properties of the pixel gray value sequence of a diagonal line can represent the value of a bit, and the values of two bits can be represented since each square image block has two diagonal lines. Therefore, it is necessary to detect the inverse number odd-even properties of the pixel gray value sequences of the first diagonal line and the second diagonal line of each square image block, so as to determine the bit value represented by the inverse number odd-even properties of the pixel gray value sequences of the first diagonal line and the second diagonal line of each square image block in the M square image blocks later.

Step E: representing the value of a bit with the inverse number odd-even property of the pixel gray value sequence of each diagonal line, and according to the principles on the one-to-one correspondence between the M square image blocks and the M bit value sets and the correspondence between the inverse number odd-even properties of the pixel gray value sequences of the first diagonal line and the second diagonal line of each square image block and the first bit value and the second bit value in the bit value set corresponding to the square image block, detecting whether the values represented by the inverse number odd-even properties of the pixel gray value sequences of the first diagonal line and the second diagonal line of each square image block in the M square image blocks are respectively consistent with the first bit value and the second bit value in the bit value set corresponding to the square image block, if no, regulating the pixel position on the square image block, so that the values represented by the inverse number odd-even properties of the pixel gray value sequences of the first diagonal line and the second diagonal line of the square image block are respectively consistent with the first bit value and the second bit value in the bit value set corresponding to the square image block. Suppose the inverse number odd-even property of the pixel gray value sequence of one diagonal line is defined as odd, the value of the bit is 1 and suppose the odd-even property is defined as even, the value of the bit is 0. Taking FIG. 4 for example, suppose the square image block is corresponding to the second bit value set as shown in FIG. 2, the inverse number odd-even property of the pixel gray value sequence of the first diagonal line of the square image block shall be even, and the inverse number odd-even property of the pixel gray value sequence of the second diagonal line shall be odd. If the inverse number odd-even properties of the pixel gray value sequences of the first diagonal line and the second diagonal line of the square image block are respectively detected as even and odd, it indicates that, the values represented by the inverse number odd-even properties of the pixel gray value sequences of the first diagonal line and the second diagonal line of the square image block are respectively consistent with the first bit value and the second bit value in the bit value set corresponding to the square image block, and there is no need to regulate the square image block, otherwise, it indicates that, it needs to regulate the square image block. During regulation on the square image block, it only needs to carry out pixel position regulation on the square image block, so that the values represented by the inverse number odd-even properties of the pixel gray value sequences of the first diagonal line and the second diagonal line of the square image block are respectively consistent with the first bit value and the second bit value in the bit value set corresponding to the square image block. Specifically, the method of pixel position regulation on each square image block comprises the following steps:

Step E1: when the value represented only by the inverse number odd-even property of the pixel gray value sequence of the first diagonal line in the square image block is inconsistent with the first bit value in the bit value set corresponding to the square image block, extracting two pixels with unequal gray values and the minimum difference from the first diagonal line, and exchanging the two pixels, so as to change the inverse number odd-even property of the pixel gray value sequence of the first diagonal line.

Step E2: when the value represented only by the inverse number odd-even property of the pixel gray value sequence of the second diagonal line in the square image block is consistent with the second bit value in the bit value set corresponding to the square image block, extracting two pixels with unequal gray values and the minimum difference from the second diagonal line, and exchanging the two pixels, so as to change the inverse number odd-even property of the pixel gray value sequence of the second diagonal line;

In step E1 and step E2, it only needs to extract two pixels on the first diagonal line or the second diagonal line for exchange, and extraction of two pixels has followed the principle of the minimum distortion (i.e. what are extracted are the two pixels with the minimum gray value difference), thus, the distortion is minimized after exchange, and the influence on the image quality after regulation is the minimum.

Step E3: when the values represented by the inverse number odd-even properties of the pixel gray value sequences of the first diagonal line and the second diagonal line in the square image block are respectively inconsistent with the first bit value and the second bit value in the bit value set corresponding to the square image block, pixel position regulation on each square image block comprises the following steps:

Step E3-1: respectively extracting a pixel from the first diagonal line and the second diagonal line of the square image block, and exchanging the two pixels;

Step E3-2: after exchange, detecting whether the inverse number odd-even properties of the pixel gray value sequences of the first diagonal line and the second diagonal line of the square image block are changed, if no, giving up this exchange and returning to the step E3-1, until the inverse number odd-even properties of the pixel gray value sequences of the first diagonal line and the second diagonal line of the square image block are changed.

In the step E3, it only needs to respectively extract a pixel from the first diagonal line and the second diagonal line for exchange, equivalently it only needs to change the gray of a pixel on each diagonal line, thereby controlling the distortion of the whole rectangular image after regulation and ensuring the image quality after regulation. To further reduce the influence on the quality of the rectangular image after regulation, some principles must be followed when the two pixels are extracted from the first diagonal line and the second diagonal line of the square image block for exchange, namely: first to extract two pixels with the minimum gray value difference from small to big according to the gray value differences between the two extracted pixels. The gray value difference refers to the difference between the gray values of the pixels on the first diagonal line and the second diagonal line of the square image block. There are several pixels on the first diagonal line and the second diagonal line of the square image block, and there is a pixel on either of two diagonal lines, so that the difference between the gray values of the two pixels is less than the difference between the gray values of other pixels on two diagonal lines. Start exchange with the two pixels, and detect whether the values represented by the inverse number odd-even properties of the pixel gray value sequences of the first diagonal line and the second diagonal line of the square image block after exchange are respectively consistent with the first bit value and the second bit value in the bit value set corresponding to the square image block, if yes, complete regulation on the square image block; if no, continue to respectively extract a pixel from the first diagonal line and the second diagonal line of the square image block for exchange, until they are consistent with each other. Start exchange with the two pixels whose gray values are the most closest, thus the influence on the image quality is the minimum after the first exchange, and the influence of each subsequent exchange on the image quality will be gradually increased. It is thus clear that, the pixel exchange way with the influence on the image quality from small to big is good for minimizing the influence on the image quality after regulation.

The data hiding process is completed after all of M square image blocks match the above conditions through regulation.

The present invention further provides a data sending method based on a data carrier of an image, comprising the steps contained by any of the aforesaid data hiding methods, and further comprising the step F: sending out the rectangular image as the carrier of the data and the secret key thereof. The secret key therein includes the size of the square image block divided by the rectangular image and the number of bits in the bit sequence converted from data.

The secret key is used for extracting data after the receiving end receives the rectangular image. The size in the secret key is used for determining how to divide the received rectangular image (i.e. divide according to the size), and the rectangular image is divided into several square image blocks with the size. The several square image blocks obtained by division can form the aforesaid rectangular image. However, the number of bits is used for determining whether to fill the bit sequence when hiding data; if the number of bits in the bit sequence is odd, it indicates there is filling, and it needs to take out the bit at the end of the bit sequence after restoration.

Figure 5:
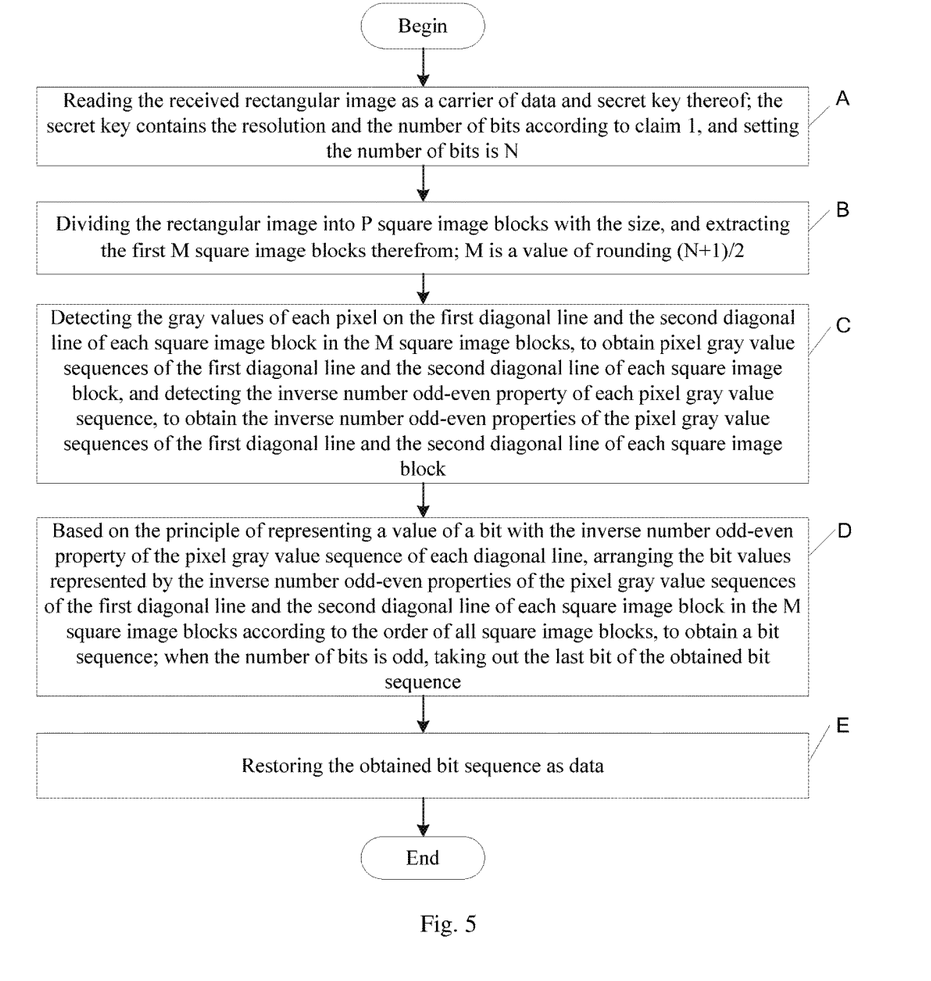
FIG. 5 is a flow diagram of the method of extracting the data sent by the aforesaid data sending method provided by the present invention.

As shown in FIG. 5, the invention further provides a method of extracting the data sent by the aforesaid data sending method, comprising the following steps:

Step 1: reading the rectangular image received as the carrier of the data and the secret key thereof, wherein the secret key includes the size of the square image block divided by the rectangular image and the number of bits in the bit sequence converted from data, and the number of bit is set as N.

Step 2: dividing the rectangular image into P square image blocks with the size, and extracting the first M square image blocks therefrom; M is a value of rounding $$\frac{N+1}{2}.$$

If the rectangular image is divided according to the size, based on the theory description in the aforesaid data hiding method, the quantity P of the obtained square image blocks will not be less than the integer part of $$\frac{N+1}{2},$$

while the integer part will be just the quantity of the bit value sets in the step of the data hiding method, so, according to the step C of the data hiding method, only the first M square image blocks are hidden with data, and it only needs to extract the first M square image blocks.

Step 3: detecting the gray values of each pixel on the first diagonal line and the second diagonal line of each square image block in the M square image blocks, to obtain pixel gray value sequences of the first diagonal line and the second diagonal line of each square image block, and detecting the inverse number odd-even property of each pixel gray value sequence, to obtain the inverse number odd-even properties of the pixel gray value sequences of the first diagonal line and the second diagonal line of each square image block.

Step 4: based on the principle of representing a value of a bit with the inverse number odd-even property of the pixel gray value sequence of each diagonal line, arranging the bit values represented by the inverse number odd-even properties of the pixel gray value sequences of the first diagonal line and the second diagonal line of each square image block in the M square image blocks according to the order of all square image blocks, to obtain a bit sequence; when the number of bits is odd, taking out the last bit of the obtained bit sequence. The principle of representing the value of a bit with the inverse number odd-even property of the pixel gray value sequence of each diagonal line must be consistent with the corresponding principle as defined in the step E of the data hiding method. The number of bits in the secret key is only used for determining whether there is a bit to be filled during data hiding, while it only needs to determine the odd-even property of the number of bits in case of determining whether there is a bit to be filled, without any need of determining the specific value of the number of bits, thus the number of bits in the secret key can be replaced with the odd-even property of the number of bits, and the two have equal effect.

Step 5: restoring the obtained bit sequence as data.

Figure 6:
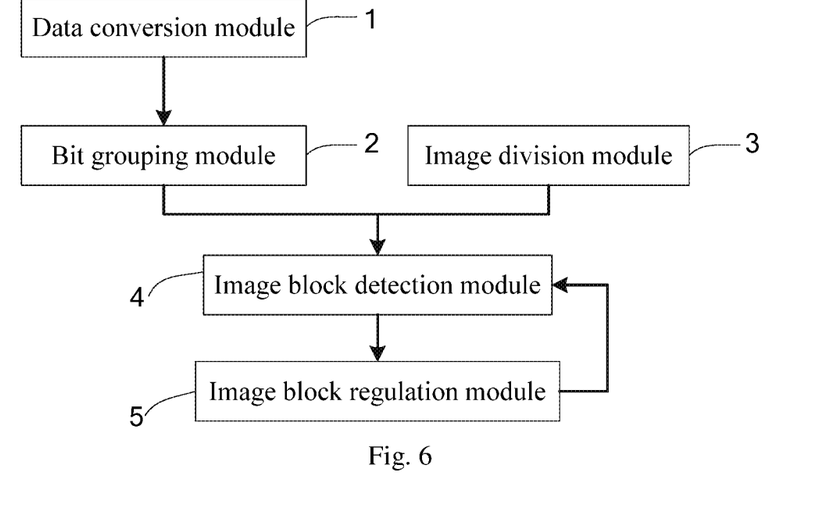
FIG. 6 is a schematic diagram of the composition of the data hiding system provided by the present invention.

As shown in FIG. 6, the present invention further provides a data hiding system, comprising:

a data conversion module 1, used for converting data into a bit sequence; when the number of bits in the bit sequence is odd, filling a bit at the end of the bit sequence, and assigning 0 or 1 to it;

a bit grouping module 2, used for extracting the values of two bits every time from the bit sequence according to the order of the bit sequence as a set, to obtain M bit value sets; setting the value of the previous bit in each bit value as a first bit value in the bit value set, and the value of the later bit as a second bit value in the bit value set;

an image division module 3, used for dividing a rectangular image as a carrier of the data into P square image blocks with the same size, P≥M, and extracting the first M square image blocks therein, wherein each square image block in the M square image blocks has a first diagonal line and a second diagonal line;

an image block detection module 4, used for detecting the gray values of each pixel on the first diagonal line and the second diagonal line of each square image block in the M square image blocks, to obtain pixel gray value sequences of the first diagonal line and the second diagonal line of each square image block, and detecting the inverse number odd-even property of each pixel gray value sequence, to obtain the inverse number odd-even properties of the pixel gray value sequences of the first diagonal line and the second diagonal line of each square image block;

an image block regulation module 5, used for representing the value of a bit with the inverse number odd-even property of the pixel gray value sequence of each diagonal line, and according to the principles on the one-to-one correspondence between the M square image blocks and the M bit value sets and the correspondence between the inverse number odd-even properties of the pixel gray value sequences of the first diagonal line and the second diagonal line of each square image block and the first bit value and the second bit value in the bit value set corresponding to the square image block, detecting whether the values represented by the inverse number odd-even properties of the pixel gray value sequences of the first diagonal line and the second diagonal line of each square image block in the M square image blocks are respectively consistent with the first bit value and the second bit value in the bit value set corresponding to the square image block, if no, regulating the pixel position on the square image block, so that the values represented by the inverse number odd-even properties of the pixel gray value sequences of the first diagonal line and the second diagonal line of the square image block are respectively consistent with the first bit value and the second bit value in the bit value set corresponding to the square image block.

During pixel position regulation on each square image block by the image block regulation module 5:

When the value represented only by the inverse number odd-even property of the pixel gray value sequence of the first diagonal line in the square image block is inconsistent with the first bit value in the bit value set corresponding to the square image block, extract two pixels with unequal gray values and the minimum difference from the first diagonal line, and exchange the two pixels, so as to change the inverse number odd-even property of the pixel gray value sequence of the first diagonal line;

When the value represented only by the inverse number odd-even property of the pixel gray value sequence of the second diagonal line in the square image block is inconsistent with the second bit value in the bit value set corresponding to the square image block, extract two pixels with unequal gray values and the minimum difference from the second diagonal line, and exchange the two pixels, so as to change the inverse number odd-even property of the pixel gray value sequence of the second diagonal line;

When the values represented by the inverse number odd-even properties of the pixel gray value sequences of the first diagonal line and the second diagonal line in the square image block are respectively inconsistent with the first bit value and the second bit value in the bit value set corresponding to the square image block, pixel position regulation on each square image block by the image block regulation module 5 comprises the following steps:

respectively extracting a pixel from the first diagonal line and the second diagonal line of the square image block, and exchanging the two pixels;

after exchange, detecting whether the inverse number odd-even properties of the pixel gray value sequences of the first diagonal line and the second diagonal line of the square image block are changed, if no, giving up this exchange and respectively extracting a pixel from the first diagonal line and the second diagonal line of the square image block again for exchange, until the inverse number odd-even properties of the pixel gray value sequences of the first diagonal line and the second diagonal line of the square image block are changed.

The principle of respectively extracting a pixel from the first diagonal line and the second diagonal line of the square image block by the image block regulation module 5 is: first to extract two pixels with the minimum gray value difference from small to big according to the gray value differences between the two extracted pixels.

The binary image data is taken below for example to explain the data hiding, sending, receiving and extraction processes in the present invention.

If the data to be sent is an binary image, the size of the binary image is 320×240. As mentioned above, first, it is necessary to convert the binary image into the bit sequence. The binary image can be scanned through raster scanning, and the gray of each pixel in the binary image is converted into a bit value, so as to form a bit sequence according to the order. The bit sequence contains 76,800 bit values. Then two bit values are extracted every time from the bit sequence according to the order as a set, consequently to form 38,400 sets of bit values arranged in order. For the rectangular image as the carrier of the binary image, it is necessary to divide the rectangular image into a proper number of square image blocks with the same size according to the size of the rectangular image and the digits of the bit sequence of the binary image. According to the aforesaid theory, the quantity of square image blocks shall not be less than 38,400 sets. After the bit sequence is grouped and the rectangular image is divided into blocks, the first 38,400 square image blocks are extracted from the rectangular image, and these 38,400 square image blocks are arranged from left to right and from up to down. There is a one-to-one correspondence between 38,400 square image blocks and the aforesaid 38,400 bit values according to the order, i.e. the first square image block (the square image block on the upper left corner) is corresponding to the first bit value set, the second square image block is corresponding to the second bit value set, and the $38,400^{th}$ square image block is corresponding to the $38,400^{th}$ bit value set. Meanwhile, the inverse number odd-even properties of the pixel gray value sequences of the first diagonal line and the second diagonal line of each square image block are respectively corresponding to the first bit value and the second bit value in the bit value set corresponding to the square image block.

After the bit sequence is grouped and the rectangular image is divided into blocks, the inverse number odd-even properties of the pixel gray value sequences of the first diagonal line and the second diagonal line of each square image block are respectively detected. The bit value represented by the diagonal line of defining the inverse number odd-even property of the gray value sequence as odd is 1, and the bit value represented by the diagonal line of defining the inverse number odd-even property of the gray value sequence as even is 0. According to the aforesaid principle, detect whether the inverse number odd-even properties of the pixel gray value sequences of the first diagonal line and the second diagonal line of each square image block are respectively corresponding to the first bit value and the second bit value in the bit value set corresponding to the square image block, if no, regulate the corresponding square image block according to the aforesaid regulation method to make them corresponding respectively, until all square image blocks are regulated.

Suppose the square image block as shown in FIG. 4 is the square image block corresponding to the second bit value set in the bit sequence as shown in FIG. 2, i.e. the second square image block in FIG. 3. The size of the square image block is 16×16. The diagonal line from the upper left corner to the lower right corner is the first diagonal line of the square image block, and the diagonal line from the upper right corner to the lower left corner is the second diagonal line of the square image block. In combination with FIG. 2, FIG. 3, FIG. 4, the first bit value of the second bit value set is 0, and the second bit value is 1. The inverse number odd-even property of the pixel gray value sequence of the first diagonal line in the square image block shall be 0, and the inverse number odd-even property of the pixel gray value sequence of the second diagonal line shall be 1. The square image block includes the following four cases: I. If the inverse number odd-even properties of the pixel gray value sequences of the first diagonal line and the second diagonal line of the square image block are even and odd, there is no need to regulate the square image block. II: If the inverse number odd-even properties of the pixel gray value sequences of the first diagonal line and the second diagonal line of the square image block are even and even, it is necessary to regulate the pixel order on the second diagonal line of the square image block, so that the inverse number odd-even property of the pixel gray value sequence of the second diagonal line becomes odd. During regulation, any two pixels with unequal gray values on the second diagonal line can be exchanged to change the inverse number odd-even property of the pixel gray value sequence, but, two pixels with unequal gray values and the minimum difference on the diagonal lines shall be exchanged to minimize the image distortion after regulation. III: If the inverse number odd-even properties of the pixel gray value sequences of the first diagonal line and the second diagonal line of the square image block are odd and odd, it is necessary to regulate the pixel order on the first diagonal line of the square image block, so that the inverse number odd-even property of the pixel gray value sequence of the first diagonal line becomes even. The regulation method is similar to the second case, so repeated description will not be made here. IV: If the inverse number odd-even properties of the pixel gray value sequences of the first diagonal line and the second diagonal line of the square image block are odd and even, extract a pixel from the first diagonal line and the second diagonal line respectively for exchange according to the difference between the gray values of the two pixels extracted from small to big, and start with the two pixels with the minimum difference between the gray values, until the inverse number odd-even properties of the pixel gray value sequences of the first diagonal line and the second diagonal line of the square image block are even and odd.

After the data is hidden in the rectangular image, the rectangular image hidden with data and the secret key can be sent out by the sending end. The secret key includes the number of bits in the bit sequence converted from the binary image data, and the size of the square image block divided by the rectangular image, and further includes relevant parameters during conversion, such as the size of the binary image. After the receiving end receives the rectangular image, the rectangular image is divided into blocks according to the size in the secret key, and the first 38,400 square image blocks are extracted according to the order of the square image blocks obtained by division. Then detect the inverse number odd-even properties of the pixel gray value sequences of the first diagonal line and the second diagonal line of each of the 38,400 square image blocks, and determine the values represented by the inverse number odd-even properties of the pixel gray value sequences of the first diagonal line and the second diagonal line of each square image block according to the corresponding principle during data hiding; arrange the values in order, to obtain the bit sequence. Meanwhile, judge whether there is a bit to be filled when the data is converted into the bit sequence according to the odd-even property of the number of bits in the secret key. If it is odd, there is a bit to be filled, and take out the last bit of the bit sequence obtained by arrangement. The size of the binary image is 320×240, i.e. there are 76,800 pixels in total, and the number of bits in the secret key is 76,800, which is even, thus, there is no bit to be filled, and the obtained bit sequence is the bit sequence obtained by conversion of the original binary image; each value in the bit sequence represents the value of a corresponding pixel in the binary image, and it is very easy to restore the bit sequence as the binary image again according to the size 320×240 of the binary image in the secret key.

All above are only preferred embodiments of the present invention, which do not limit the scope of the present invention. All alterations, equivalent replacements and improvements, without departing from the spirit and principle of the present invention shall fall in the protection scope of the present invention.

The invention claimed is:

1. A data hiding method, comprising the following steps:
Step A: converting data into a bit sequence; when a number of bits in the bit sequence is odd, filling a bit at an end of the bit sequence, and assigning 0 or 1 to the filled bit;
Step B: extracting values of two bits every time from the bit sequence according to an order of the bit sequence as a set, to obtain M bit value sets, where M is a number of the bit value sets; setting a value of a previous bit of the two bits in each bit value set as a first bit value in the bit value set, and a value of a later bit of the two bits as a second bit value in the bit value set;
Step C: dividing a rectangular image as a carrier of the data into P square image blocks with a same size, P is a number of the square image blocks, P≥M, and extracting the first M square image blocks therein; each square image block in the M square image blocks has a first diagonal line and a second diagonal line;
Step D: detecting gray value of each pixel on the first diagonal line and the second diagonal line of each square image block in the M square image blocks, to obtain pixel gray value sequences of the first diagonal line and the second diagonal line of each square image block, and detecting a parity of an inverse number of each pixel gray value sequence, to obtain the parity of the inverse number of each of the pixel gray value sequences of the first diagonal line and the second diagonal line of each square image block;

Step E: representing a value of a bit with the parity of the inverse number of the pixel gray value sequence of each diagonal line, and according to a principle on a one-to-one correspondence between the M square image blocks and the M bit value sets and a correspondence between the parity of the inverse numbers of the pixel gray value sequences of the first diagonal line and the second diagonal line of each square image block and the first bit value and the second bit value in the bit value set corresponding to the square image block, detecting whether the values represented by the parity of the inverse numbers of the pixel gray value sequences of the first diagonal line and the second diagonal line of each square image block in the M square image blocks are respectively consistent with the first bit value and the second bit value in the bit value set corresponding to the square image block, if no, regulating a pixel position on the square image block, so that the values represented by the parity of the inverse numbers of the pixel gray value sequences of the first diagonal line and the second diagonal line of the square image block are respectively consistent with the first bit value and the second bit value in the bit value set corresponding to the square image block.

2. The data hiding method according to claim 1, wherein the method of pixel position regulation on each square image block comprises the following steps:

Step E1: when the value represented only by the parity of the inverse number of the pixel gray value sequence of the first diagonal line in the square image block is inconsistent with the first bit value in the bit value set corresponding to the square image block, extracting two pixels with unequal gray values and a minimum difference from the first diagonal line, and exchanging the two pixels from the first diagonal line, so as to change the parity of the inverse number of the pixel gray value sequence of the first diagonal line;

Step E2: when the value represented only by the parity of the inverse number of the pixel gray value sequence of the second diagonal line in the square image block is inconsistent with the second bit value in the bit value set corresponding to the square image block, extracting two pixels with unequal gray values and a minimum difference from the second diagonal line, and exchanging the two pixels from the second diagonal line, so as to change the parity of the inverse number of the pixel gray value sequence of the second diagonal line;

Step E3: when the values represented by the parity of the inverse numbers of the pixel gray value sequences of the first diagonal line and the second diagonal line in the square image block are respectively inconsistent with the first bit value and the second bit value in the bit value set corresponding to the square image block, comprising the following steps:

Step E3-1: respectively extracting a pixel from the first diagonal line and the second diagonal line of the square image block, and exchanging the two pixels from the first diagonal line and from the second diagonal line;

Step E3-2: after exchange, detecting whether the parity of the inverse numbers of the pixel gray value sequences of the first diagonal line and the second diagonal line of the square image block are changed, if no, giving up this exchange and returning to the step E3-1, until the parity of the inverse numbers of the pixel gray value sequences of the first diagonal line and the second diagonal line of the square image block are changed.

3. The data hiding method according to claim 2, wherein the principle of respectively extracting a pixel from the first diagonal line and the second diagonal line of the square image block is: first to extract two pixels with the minimum gray value difference from small to big according to the gray value differences between the two extracted pixels.

4. The data hiding method according to claim 1, wherein, if the size of the square image block is W×W, W is an even number, and W≥4.

5. A data sending method based on a data carrier of an image, comprising the steps contained by the data hiding method according to claim 1, and further comprising the following step:

Step F: sending out the rectangular image as the carrier of the data and a secret key of the rectangular image; the secret key contains the size and the number of bits as defined in claim 1.

6. A method of extracting data sent by the data sending method according to claim 5, comprising the following steps:

Step 1: reading the received rectangular image as the carrier of the data and the secret key of the rectangular image; the number of bits is set as N;

Step 2: dividing the rectangular image into P square image blocks with the size, and extracting the first M square image blocks therefrom; M is a value of rounding $$\frac{N+1}{2};$$

Step 3: detecting the gray values of each pixel on the first diagonal line and the second diagonal line of each square image block in the M square image blocks, to obtain the pixel gray value sequences of the first diagonal line and the second diagonal line of each square image block, and detecting the parity of the inverse number of each pixel gray value sequence, to obtain the parity of the inverse numbers of the pixel gray value sequences of the first diagonal line and the second diagonal line of each square image block;

Step 4: based on the principle of representing a value of a bit with the parity of the inverse number of the pixel gray value sequence of each diagonal line, arranging the bit values represented by the parity of the inverse numbers of the pixel gray value sequences of the first diagonal line and the second diagonal line of each square image block in the M square image blocks according to the order of all square image blocks, to obtain a bit sequence; when the number of bits is odd, taking out the last bit of the obtained bit sequence;

Step 5: restoring the obtained bit sequence as data.

7. A data hiding system, comprising:
a processor; and
a memory coupled to the processor and having instructions stored thereon;
wherein the processor, when executing the instructions, is configured
for converting data into a bit sequence; when a number of bits in the bit sequence is odd, filling a bit at an end of the bit sequence, and assigning 0 or 1 to the filled bit;

for extracting values of two bits every time from the bit sequence according to an order of the bit sequence as a set, to obtain M bit value sets, where M is a number of the bit value sets; setting a value of a previous bit of the two bits in each bit value as a first bit value in the bit value set, and the value of a later bit of the two bits as a second bit value in the bit value set;

for dividing a rectangular image as a carrier of the data into P square image blocks with a same size, P is a number of the square image blocks, P≥M, and extracting the first M square image blocks therein; each square image block in the M square image blocks has a first diagonal line and a second diagonal line;

for detecting gray values of each pixel on the first diagonal line and the second diagonal line of each square image block in the M square image blocks, to obtain pixel gray value sequences of the first diagonal line and the second diagonal line of each square image block, and detecting the parity of the inverse number of each pixel gray value sequence, to obtain the parity of the inverse number of each of the pixel gray value sequences of the first diagonal line and the second diagonal line of each square image block;

for representing a value of a bit with the parity of the inverse number of the pixel gray value sequence of each diagonal line, and according to a principles on a one-to-one correspondence between the M square image blocks and the M bit value sets and a correspondence between the parity of the inverse numbers of the pixel gray value sequences of the first diagonal line and the second diagonal line of each square image block and the first bit value and the second bit value in the bit value set corresponding to the square image block, detecting whether the values represented by the parity of the inverse numbers of the pixel gray value sequences of the first diagonal line and the second diagonal line of each square image block in the M square image blocks are respectively consistent with the first bit value and the second bit value in the bit value set corresponding to the square image block, if no, regulating a pixel position on the square image block, so that the values represented by the parity of the inverse numbers of the pixel gray value sequences of the first diagonal line and the second diagonal line of the square image block are respectively consistent with the first bit value and the second bit value in the bit value set corresponding to the square image block.

8. The data hiding system according to claim 7, wherein the method of pixel position regulation on each square image block comprises the following steps:

when the value represented only by the parity of the inverse number of the pixel gray value sequence of the first diagonal line in the square image block is inconsistent with the first bit value in the bit value set corresponding to the square image block, extracting two pixels with unequal gray values and a minimum difference from the first diagonal line, and exchanging the two pixels from the first diagonal line, so as to change the parity of the inverse number of the pixel gray value sequence of the first diagonal line;

when the value represented only by the parity of the inverse number of the pixel gray value sequence of the second diagonal line in the square image block is inconsistent with the second bit value in the bit value set corresponding to the square image block, extracting two pixels with unequal gray values and a minimum difference from the second diagonal line, and exchanging the two pixels from the second diagonal line, so as to change the parity of the inverse number of the pixel gray value sequence of the second diagonal line;

when the values represented by the parity of the inverse numbers of the pixel gray value sequences of the first diagonal line and the second diagonal line in the square image block are respectively inconsistent with the first bit value and the second bit value in the bit value set corresponding to the square image block, comprising the following steps:

respectively extracting a pixel from the first diagonal line and the second diagonal line of the square image block, and exchanging the two pixels from the first diagonal line and from the second diagonal line;

after exchange, detecting whether the parity of the inverse numbers of the pixel gray value sequences of the first diagonal line and the second diagonal line of the square image block are changed, if no, giving up this exchange and respectively extracting a pixel from the first diagonal line and the second diagonal line of the square image block again for exchange, until the parity of the inverse numbers of the pixel gray value sequences of the first diagonal line and the second diagonal line of the square image block are changed.

9. The data hiding system according to claim 8, wherein the principle of respectively extracting a pixel from the first diagonal line and the second diagonal line of the square image block is: first to extract two pixels with the minimum gray value difference from small to big according to the gray value differences between the two extracted pixels.

* * * * *